UNITED STATES PATENT OFFICE.

WILLIAM O. DE MARS, OF CLEVELAND, OHIO.

PUNCTURE-HEALING COMPOSITION.

SPECIFICATION forming part of Letters Patent No. 699,083, dated April 29, 1902.

Application filed June 12, 1901. Serial No. 64,321. (No specimens.)

*To all whom it may concern:*

Be it known that I, WILLIAM O. DE MARS, a citizen of the United States, and a resident of Cleveland, county of Cuyahoga, and State of Ohio, have invented a new and useful Improvement in Puncture-Healing Composition, of which the following is a specification, the principle of the invention being herein explained and the best mode in which I have contemplated applying that principle, so as to distinguish it from other inventions.

My invention relates to means for repairing punctures and ruptures in pneumatic tires; and the object of the invention is to provide a composition or admixture of elements which can be deposited in the tire and will do such repairing or healing automatically and with means which will not exert a deleterious effect upon the rubber forming a constituent part of the tire.

Said invention therefore consists of an admixture of mica flakes and water as a vehicle for disseminating the mica in the tire and promoting the sealing, all substantially as herein fully described, and particularly pointed out in the claim.

I am aware that various sealing mixtures, compositions, and compounds of various kinds have been devised and more or less successfully used for a greater or less time for sealing tire-punctures, especially small ones, and of such mixture or means I do not claim to be, broadly, the inventor; but I am not aware that any one has ever before known or used the novel composition and admixture constituting my invention or any equivalent thereof in kind or quality.

My invention therefore comprises the two elements of mica flakes and water, and in this combination the mica acts alone as the sealing agent and the water as possibly the chief medium or vehicle of distribution and delivery, the part which the air in the tube performs being a somewhat unknown and undetermined quantity.

Punctures or ruptures usually occur when the tire is in action. If the hole made be large, there must be great promptness in the sealing medium or the tire will collapse. Hence such medium or agent must have exceptional responsiveness or it will fail of its first object, because a perfect seal should take care of a reasonably-large puncture, such as by a nail will produce, without dismounting if it be a bicycle or stopping if it be a vehicle. Then also there must be an equally responsive and otherwise acceptable vehicle or agent for delivering the sealing medium to the puncture or again it would fail of its object. Such medium I have found to be common water which may be found anywhere. A comparatively small quantity of water mixed with the mica flakes—say two ounces of water to one-third of an ounce of the flakes—will suffice for a single bicycle-tire and will last for a long time—say for an entire summer season—if the punctures be not excessive in number and size, whereby much leakage may occur. The water is practically inert in so far as pertains to chemical action upon the rubber and no deleterious effect results from its continued applications to and contact with the rubber. The mica is also inert in so far as pertains to both the rubber and the water; and hence each flake maintains its integrity indefinitely. Being flaky it presents a flat surface to the puncture and permits the flakes to overlap and to pile flatwise upon each other as long as leakage and suction occur. Thereby they form a structure rigid and immovable as compared with a mass which would be formed by comminuted material not of a flaky form, such as the granular mineral matter existing in mud, which has heretofore been used by some. Furthermore, such flaky material does not really get into the puncture like small particles, such as sand, and hence does not hinder the natural tendency of the rubber around the puncture to close as a result of its own elasticity and closing tendency.

The very slight specific gravity and the flaky form of the mica furnish a seal which is held practically in suspension in the tire and which causes it to be easily conveyed by the water and the air and applied to the puncture the moment it is made. In this respect it presents such material difference in character and operation as compared with viscous liquids or comminuted granular mineral of greater specific gravity that it is a distinctly different thing, having no equivalent at this time, so far as known.

What I claim is—

A puncture-healing composition consisting of an admixture of water and flaky mica in the proportions substantially as set forth, the same constituting a seal of such nature that the light flakes of mica remain suspended for a prolonged period and do not pack when at rest, all substantially as hereinbefore described.

Signed by me this 8th day of June, 1901.

WILLIAM O. DE MARS.

Attest:
D. T. DAVIES,
A. E. MERKEL.